March 18, 1969  J. P. CHISHOLM  3,434,140
MATRIX NAVIGATION SYSTEM
Filed Oct. 26, 1966  Sheet 1 of 2

INVENTOR
JOHN P. CHISHOLM

BY Alexander & Dowell
ATTORNEYS

March 18, 1969  J. P. CHISHOLM  3,434,140
MATRIX NAVIGATION SYSTEM
Filed Oct. 26, 1966

INVENTOR
JOHN P. CHISHOLM

BY *Alexander & Dowell*

ATTORNEYS

United States Patent Office 3,434,140
Patented Mar. 18, 1969

3,434,140
MATRIX NAVIGATION SYSTEM
John P. Chisholm, Box 2122, Olympic
Valley, Calif. 95730
Filed Oct. 26, 1966, Ser. No. 589,698
U.S. Cl. 343—6
Int. Cl. G01s 9/00
10 Claims

ABSTRACT OF THE DISCLOSURE

An air traffic control system illustrated by an example in which a large number of mobile units, and perhaps a few similar fixed units, exchange signals from which each unit can determine identity and range to other nearby units. No bearings are usually taken, but instead a central computer receives all these ranges and identities, and computes and displays a geometric figure made up of points each of which represents the relative position of a unit, the spacings between points being proportional to the ranges. The computing of portions of such a figure which are in remote areas outside of direct radio range is made possible by having the remote aircraft associate related identity and range signals and then relay such paired data back toward the computer through other units located nearer to it. The fact that range data is taken by several aircraft as a result of separate measurements made at the several local aircraft, and then relayed separately back to the computer, provides a degree of redundancy useful to the computer in checking the correctness of its figure. Identities and functions are kept separate by time sharing techniques, and where fixed reference points are absent, one or more aircraft can take occasional directional measurements and telemeter enough azimuth data to the computer to orient its figure with respect to earth coordinates.

This invention relates to improvements in vehicle traffic control systems, and more particularly to a novel system for handling higher density air traffic while safety routing aircraft closer together both with regard to horizontal separations as well as altitude separations.

Basically, the problem of traffic congestion does not stem from actual closeness together of aircraft, but from the crudeness of the means by which separations are measured and maintained during flight. In turn, this crudeness results not only from difficulties in measuring separations, but also from difficulties in presenting large amounts of information concerning altitude, range and bearings in such a way as will permit a traffic controller to clearly see the true mutual relationships in space of the aircraft involved. Traditionally, these difficulties have been minimized by providing enormous guard spaces around each aircraft.

This invention seeks to safely reduce this waste of air space by employing computer techniques to accurately produce a display comprising a geometric configuration including all of the aircraft involved within a particular controlled air space. Reduced to its simplest terms, if the ranges between a plurality of aircraft are known, these ranges uniquely determine a spatial configuration in which an aircraft appears at each point of intersection. At any particular instant of time, this configuration is a rigid "matrix" resembling a child's tinker toy. A computer can easily determine this matrix from the following data supplied by each of the aircraft involved: identity of the aircraft, its altitude, and ranges to several other identified aircraft involved in the matrix. The more ranges supplied, the greater the redundancy of the determination. When ranges between three or more aircraft or stations are provided, no directional data need be obtained or transmitted to the computer in order to uniquely determine the matrix, and this fact is very important because of the practical difficulty involved in mounting and operating scanning antennas upon today's high-speed aircraft. Equipmentwise, this present system gives up the scanning antenna and replaces it with a computer. Such a trade-off of equipment is highly favorable in view of the fact that the computer is rapidly becoming standard aircraft equipment. It is already aboard military craft and some commercial craft; and the above-mentioned matrix determinations required by the present system are well within the capability of these existing airborne computers.

One of the common techniques in current use involves the assignment of unique time-slots to participating aircraft, during which time slot each individual aircraft telemeters its identity, its altitude, and other flight information to ground control stations. These time-slots repeat cyclically and can be synchronized in flight with such accuracy as to permit the use of one-way ranging techniques between multiple units whose mutual ranges are variable, for instance as suggested by Graham U.S. Patent 3,183,504; Perkinson U.S. 3,250,896; or Muth U.S. 3,068,473. This type of range measurement depends upon each unit having an accurate time clock so that when it transmits in its own time slot a signal marking its own position, all other local aircraft can determine their range to it by measuring the one-way propagation time between the known instant of transmission of said signal and the instant of local reception thereof at the latter aircraft. The above-mentioned Graham and Perkinson patents, as well as others such as Minneman 2,869,121 teach efficient clock-synchronizing means for maintaining the required time-slot accuracy, and the patent to Muth and others such as Maresca 3,119,107 teach the idea of using highly accurate clocks, perhaps atomic clocks, which can be set before take-off and which will retain satisfactory accuracy during normal-length flights. Thus, the obtaining of highly accurate multiple ranges between aircraft using simple omniantennas is well within the present state of the art and requires no detailed elaboration.

The data available from the various aircraft can be used within the aircraft by a local computer and/or can be telemetered to a computer center either directly, or via a synchronous satellite system as discussed in an article entitled "Satellites Offer Wide Use to Airlines" beginning on page 86 of "Aviation Week and Space Technology," Oct. 25, 1965. Several different working examples of the present system using data-link techniques will be discussed hereinafter.

In order for a computer to determine a matrix of points defining the momentary relative locations of the aircraft, the data from the aircraft must include identifications, altitudes, and ranges to at least some of the other aircraft and/or fixed stations, such as airports, weather ships, satellites, etc. Since the computers now used in aircraft and at some of the more sophisticated airport installations accept digitized data, it is well to consider examples of practical digital data link systems. Selecting one-second repetition intervals for consideration, if each interval is divided into 10 time slots, each time slot would be 100,000 microseconds long. If each interval is divided into 100 time slots, then each slot would be 10,000 microseconds in length, the latter time slot being capable of transmitting a great deal of information while still having a large proportion of the slot left over to serve as a guard space before the next slot commences. Of course, it is not necessary that the series of time slots repeat at a rate of once per second, this interval being used only as an illustration.

The bandwidth of the information channel determines the rate at which information can be transmitted. For instance, if the bit rate is one megacycle, 10,000 bits can be transmitted during each of the one hundred time slots. If the bit rate were 10 megacycles, then 100,000 bits could be transmitted during each time slot, and so on. Assume a one megacycle bit rate. The data link systems currently in use require about 10 bits to transmit the identity of an aircraft, and 10 more bits to transmit its altitude, these messages having used only 20 of the 10,000 bits available. In accordance with the present system, the next information transmitted would include the range to another aircraft and its identity, thereby using another 20 or 30 bits. Assuming that it requires 30 bits to identify and range each of plural local aircraft, it is easily seen that ranges to 100 other aircraft could be transmitted using 3,000 bits. As a practical matter, of course, it is unlikely that any such number of ranges would be transmitted by a single aircraft. At any rate, it is already apparent that no more than one-third of a 10,000 microsecond time slot would be needed to perform all of the telemetering which an aircraft could wish to perform according to the present system, thus leaving a large guard space between time slots. One of the advantages of the present system is that the more traffic there is in a particular controlled air space, the greater the redundancy of information supplied to the computer or computers, and therefore the more accurate the representation of the matrix showing locations of aircraft. Since each aircraft will transmit its own identity and its own altitude at the beginning of its time slot, the vertical components of the matrix are all known to the computer. Thus, it is not necessary to transmit any additional information concerning altitude of any other aircraft.

Another mode of operation of the present system permits adequate data link performance in the absence of the satellites, in situations where loss of signals usually occurs between land-based stations and aircraft, i.e., flying the Atlantic or Pacific Oceans. Since so much more data can be telemetered during these time slots than is required to adequately define a matrix, remaining portions of these time slots can be used merely to repeat information from more remote aircraft through aircraft closer to ground stations. In other words, the data need not be returned by a satellite, but it can sweep back toward land through the other aircraft in the matrix which store and repeat the information until it finally reaches the land-based computer.

If it is assumed for the purpose of providing still another example that no land-based stations are involved in the matrix of an air space being considered, or if it is assumed that all of the aircraft involved are well beyond ground based surveillance radar, then the mere defining of an overall matrix configuration does not fully define the positions and movements of the aircraft since the matrix would not be oriented with respect to North, or with respect to some other arbitrary direction. In other words, all aircraft are oriented with respect to each other, but their absolute directions are not defined. Therefore, in order to orient the computed matrix additional information is needed. This information can be supplied by having some of the aircraft telemeter bearing information to other, such information being obtainable by simple direction finder. Another way of orienting the matrix when it is located over the sea would be to include several weather ship locations in the data. At the present time there are seven weather ships in the North Atlantic maintained at fixed stations.

The computed matrix coordinates are presented by the computer to a suitable display, for instance an alphanumeric display on a cathode ray tube face, of the type currently in use at the New York Air Route Traffic Control Center, which is discussed in detail in an article beginning on page 119 of "Aviation Week and Space Technology" magazine of Sept. 26, 1966, similar systems being in use at other stations, for instance at Atlanta, Ga. The display discussed in the article is driven by a Univac 1218 computer and provides identity, altitude, outline of the local topography, and the location of the aircraft with respect thereto, all presented on PPI scope. The present state of the art provides various other types of displays also. The information which the computer stores is necessarily three dimensional, because otherwise it would not define a geometric figure whose legs would close. Among other visual displays available as standard equipment on present computer systems, the operator can obtain a plan view of the matrix which is analogous to an ordinary PPI presentation, or the matrix can be viewed in elevation by operating a different control. There are of course other aids available to assist in assembling local PPI information to synthesize displays representing larger areas. At the present time there are a number of schemes under investigation for providing three dimensional displays, the FAA being engaged in making a study along this line. When the art is better developed, perhaps a three dimensional display would be practical using holograms. At any rate, standard computers will drive a suitable display system which may include topographic information as well as identity, altitude, and relative positions of the aircraft. Such a display is the subject of a report by the Radio Technical Commission for Aeronautics, S.C. Report No. 11.

It is therefore the object of this invention to teach the provision of information fully defining the positions of aircraft and based upon information obtained locally at the aircraft while at the same time eliminating all need for means for obtaining scanning bearing information on a multitude of aircraft.

Other objects and advantages of the present invention will become apparent during the following discussion of the drawings, wherein.

The present drawings schematically illustrate several practical applications of the present invention, these applications being described in connection with the appropriate figures as follows.

Figure 1:
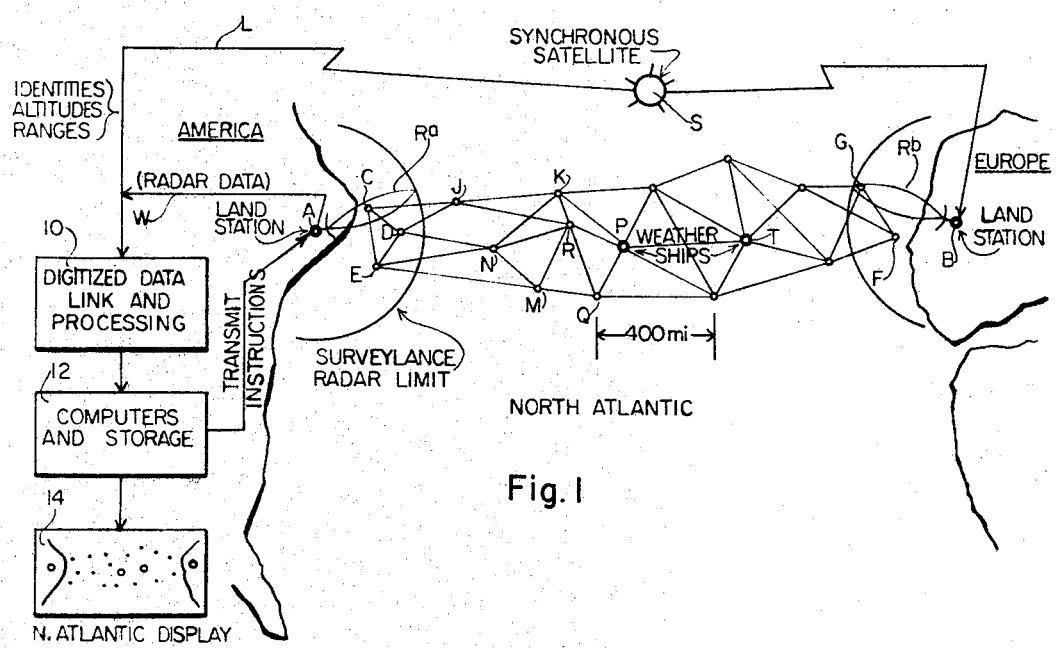
FIG. 1 is a schematic diagram illustrating one embodiment of the invention.

Referring now to FIG. 1, this figure is designed to show the use of the present invention to control an entire pattern of traffic distributed over a large area, i.e., the Atlantic Ocean. At present, translantic aircraft are assigned definite tracks when crossing the ocean, these tracks being 120 miles apart and also divided into assigned altitudes. Aircraft travelling in opposite directions fly at different altitudes, but aircraft flying in the same direction may fly at the same altitude, but are timed to provide about 15 or 20 minutes spacing. Unfortunately, the airlines experience peak traffic on the North Atlantic routes at about the same time of day, and it often happens that an aircraft must fly hundreds of miles off of the shortest route in order to stay in an assigned track. The spacing between tracks must necessarily be large in view of the fact that the navigation means tends to become inaccurate in the middle of the North Atlantic when the aircraft are out of communication with land, and at the moment when their cumulative errors are likely to maximize.

The present navigational system is based upon the fact that aircraft units can easily measure range to other aircraft units using omnidirectional one-way ranging techniques in assigned time slots as discussed above. If the range is known from each unit to several other units, including for example aircraft, weather ships, or land stations within its radio range, it is a very simple matter for even a small computer to solve the triangulation equations necessary to form a rigid matrix in which only altitudes, participating units' identities and mutual ranges are known as shown in FIG. 1. Thus, during its own time slot each aircraft will transmit its own identity, its own altitude and ranges to several other units including aircraft or fixed stations. This transmission is accomplished by digitized codes which are currently in use in the commercial airline art. A brief discussion of the code, of a suitable time-slot scheme for multiple aircraft, and the equipment carried in each aircraft will be presented hereinafter. For the moment, assume that these three items of information, namely identity, altitude and ranges are transmitted in assigned time slots from the various units represented by the dots over the North Atlantic as shown in FIG. 1. This information can be relayed from the satellite S shown in FIG. 1 to land stations A and/or B respectively located in America and Europe. Only the American data processing equipment is illustrated in the block diagram, although it is assumed that similar equipment would be employed at the European land station B. Both land station units have surveillance radar $Ra$ and $Rb$ which radars are capable of determining the exact positions of aircraft within about 200 miles of the land stations. Thus, aircraft C, D and E would be within the surveillance of radar $Ra$, and aircraft F and G would be within the surveillance of radar $Rb$. Nevertheless, these aircraft would also transmit ranges to other stations and to other aircraft, including probably the land stations A and B.

Considering now the use of this data at land station A, the digitized data is received by the radio link L, and by land wire W. The radar surveillance data is also fed into a digitized data link and processing system 10. This system receives the digital messages and decodes them into identities, altitudes, and ranges. The input from the radar $Ra$ is also range data. All of this data is then presented to a computer 12. This computer generally is one of the large land based units, for instance a Univac 1218. Only a small portion of the capability of this computer is used, and the remaining capability thereof is used to store airline schedules, computer peak traffic loads, and serve many other administrative functions of the airlines. The computer 12 in turn feeds a display 14 preferably of the alphanumeric type which is presently being used at the New York and Atlanta computer centers as mentioned above. The present alphanumeric equipment tags the aircraft blip on the face of a cathode ray tube with identifying airline flight number, altitude, and computer entry number, as well as other useful data. The computer also provides an outline of land masses and other navigational features in order to further clarify the display 14. The particular character of the display 14 need not be further discussed at this point since there are a number of prior art techniques for this purpose.

Basically, the computer performs a very simple mathematical function at a very high rate of speed in processing the range data delivered to it via the data link L. For instance, provided with three ranges between aircraft C, D, and E, and their altitudes, the computer can compute the triangle C, D and E. Since the information is three dimensional, the computer also takes into account the different altitudes of the aircraft C, D, and E whose altitudes are all reported to it during each complete time-slot cycle. However, the computer cannot orient the triangle C, D, and E in space without further information. There are a number of ways of providing this orientation, several of which are shown in the present FIG. 1. One way is to use the radar bearings of the aircraft C, D, and E, or any two of them, from the fixed station A as determined by the radar $Ra$. This is easily accomplished because of the fact that the radar ranges also have bearings associated therewith, all referred to North. Moreover, it is to be remembered that the triangle C, D, E also is related to other triangles in the matrix formed, for instance, by aircraft J, K, M, N, P, Q, R, etc. Note that station P is a weather ship lying at anchor in a known position, and that T is also a weather ship whose position is known, and which is also included in the matrix. Thus, the weather ship locations establish the matrix orientation. Moreover, the matrix orientation is established redundantly by the radars $Ra$ and $Rb$, and perhaps by other aircraft navigational aids such as inertial platform systems or Loran systems used for navigation by the various aircraft. The computer takes in all of this information and uniquely determines the various triangles shown in FIG. 1 including the various stations involved and the various aircraft. There will be only one solution of all triangles which forms a consistent matrix as shown in FIG. 1, and the function of the computer is to find this one matrix and deliver it to the display means 14.

At any one instant of time the ensemble of aircraft, weather ships, and land stations can be thought of as forming a fixed matrix, but this matrix continuously changes, and these changes are continuously resolved by the computer 12 to update the display 4. Thus, the points of the matrix determine a rigid polyhedron configuration in space which can be displayed as a plan view as shown at 4, and with further advance in the display art, can be represented as a three dimensional display. It is important to note that the aircraft do not need to take any bearings whatever in order to establish this figure, and in fact even the land based radars are not necessary to satisfactory operation, so long as several fixed points exist or such points can be determined to orient the polyhedron as seen in plan view. The vertical components are all known continuously. Other figure-orienting possibilities include the use of the satellite itself to provide positional information, the transmission of bearings by some of the aircraft in the ensemble, for instance as determined by simple direction finder means, or the transmission of courses by various aircraft in the ensemble.

The important thing to note is that no directional antennas are required aboard the aircraft. The present system therefore suggests a way of eliminating directional antennas from the aircraft and replacing their functions by computer means, which are in many cases already aboard the aircraft. This is a very advantageous trade-off of an antenna which is almost impossible to mount on a high-speed aircraft for a small computer which will be standard equipment aboard all commercial aircraft within the next few years anyhow.

Figure 2:
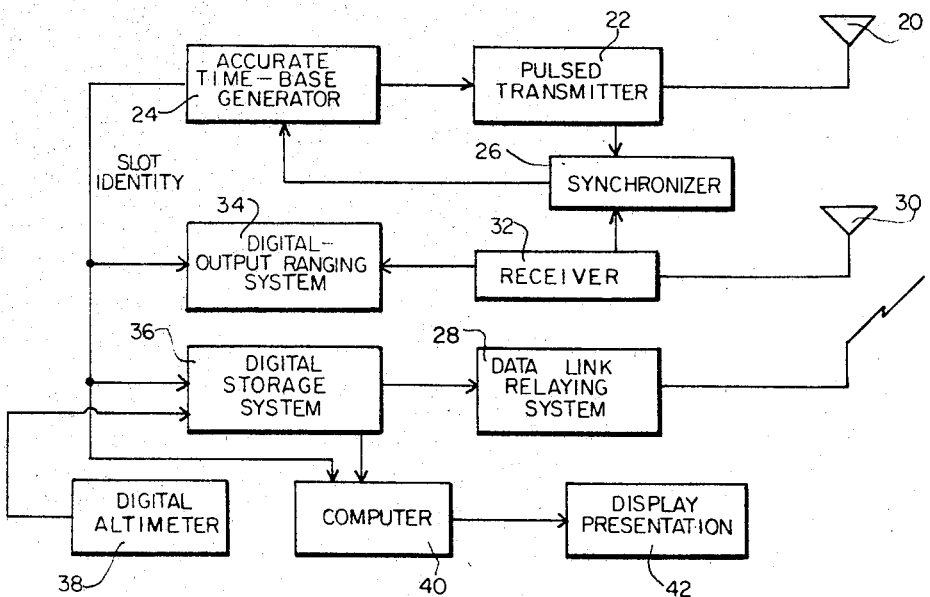
FIG. 2 is a block diagram showing a system suitable for use aboard a typical aircraft.

Referring now to FIG. 2 this figure shows a block diagram of the equipment necessary in each aircraft for the present purpose. This equipment includes antennas 20 and 30, which may in a practical installation comprise the same antenna. Both are omnidirectional. The antenna 20 is connected to a transmitter 22 capable of transmitting pulses which may comprise coded pulse groups for the purpose of uniquely specifying the character of the transmission. For instance, a pair of four microsecond pulses spaced five microseconds apart could identify an aircraft position marking pulse. This technique is old and well-known and has been described in greater detail in prior art patents, for instance Fletcher and Chisholm U.S Patent 3,153,232. The transmitter is in turn triggered at the appropriate moment in the time slot assigned to the present aircraft by an accurate time base generator 24 whose accuracy may be synchronized from time to time by a synchronizer 26 which is referred to herein only generally, and may be of the type discussed in one of the above-mentioned Graham or Perkinson patents, or others. If an atomic clock furnishes the time base in the block 24 no further synchronization is necessary after the aircraft leaves the ground during a flight of normal duration.

The receiving antenna 30 is connected to a receiver 32 which also comprises part of the synchronizing apparatus, which receives marker pulses from other aircraft during the time slots assigned thereto and delivers these pulses to a ranging system 34 having a digital output. The time base generator 24 is also coupled to the ranging system 34 since it provides means for determining the positions in time of the assigned time slots. All of this information is stored in a digital storage system 36 which receives digital information from an altimeter 38 in the present aircraft and which also includes automatic means for digitally identifying the present vehicle. Finally, the information is read out from a data relaying system 28 either to the satellite or to a land station directly. It is to be further noted that the present aircraft may also include its own display presentation 42 driven by a computer 40 contained within that aircraft. The units 40 and 42 are optional, but provide the aircraft with means for performing its own navigation without contact with any land based system or remote processing system.

It was briefly mentioned above that in the absence of a synchronous satellite system, the aircraft could transmit data back through the matrix step-by-step until it reaches a shore station. For example, each aircraft could receive range information from other aircraft and store it in its own storage system 36 and then read it out through its data link relay system 28 to another aircraft flying within its range, the other aircraft storing the information temporarily and then transmitting it all to still other aircraft and so on until the information reaches the land station by sweeping through the ensemble of aircraft comprising the matrix. In this event the digital storage and data link systems would serve the dual purpose of storing and transmitting information developed within its own aircraft, and also storing and transmitting information developed in other aircraft but transmitted to the present aircraft merely to be repeated thereby to other stations.

Figure 3:
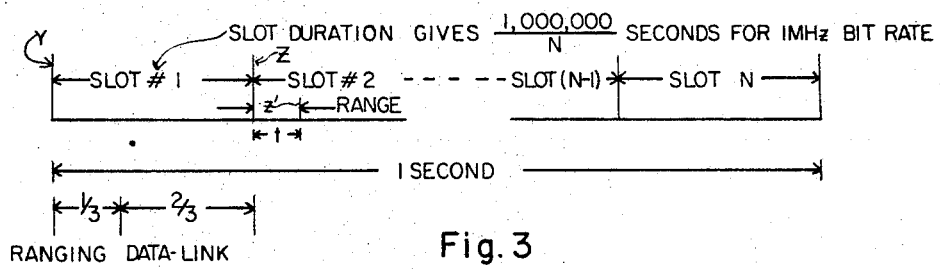
FIG. 3 is a diagram illustrating the division of cyclic time intervals into assigned time slots.

Referring now to FIG. 3, this figure shows a typical example of a time-sharing system using unique time slots assigned to each aircraft. For example, at the beginning of time slot #1 aircraft #1 transmits its marker pulse Y, and other aircraft having synchronized time slots receive the pulse Y and are able to measure the range from their own position to aircraft #1. At the beginning of time slot #2 aircraft #2 transmits its marker pulse Z, and aircraft #1 for example receives the pulse Z' at a later time $t$. Since the propagation rate is known, the time $t$ furnishes an indication within aircraft #1 of the range to transmitting aircraft #2. Aircraft #1 retains this range to aircraft #2 in its storage system 36 and reads out the range from aircraft #1 to aircraft #2 when it is reporting to the central computer during the next suceeding time slot #1.

Figure 4:
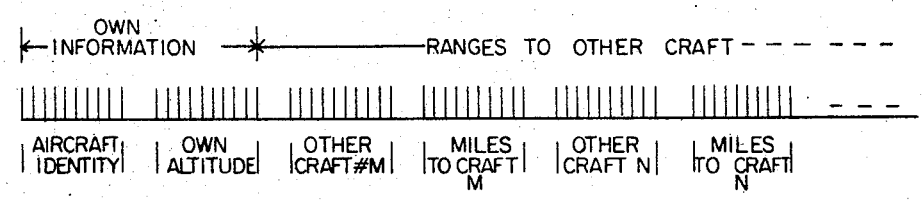
FIG. 4 is a diagram illustrating a code useful for telemetering information from the aircraft.

The type of digital code currently employed for aircraft communications is illustrated in FIG. 4. This figure shows how the data link portion of a time slot can be used to perform the required functions. For instance, the first 10 binary bits in the code can identify the transmitting aircraft, followed by a guard space if desired; the next 10 bits can be used to transmit the aircraft's own altitude, followed by another guard space if desired; and these two encoded data thus provide the aircraft's own information. Another guard space can be provided if desired, and then the aircraft can transmit another identification of the first other aircraft $m$ to which it is ranging, followed by a guard space; followed by another 10 bits indicating the range to the other aircraft $m$. This information can then be followed by a guard space which in turn can be followed by another 10 bit binary code identifying another aircraft $n$, followed by another guard space and then another code group indicating range in miles to aircraft $n$, etc. Note that in transmitting its own identity, its own altitude, and its range to two other aircraft, the present data link has used only 60 bits, plus whatever guard spaces may be provided. It should therefore be apparent how much information can be transmitted in 6,600 microseconds assuming a one megacycle bit rate.

Figure 5:
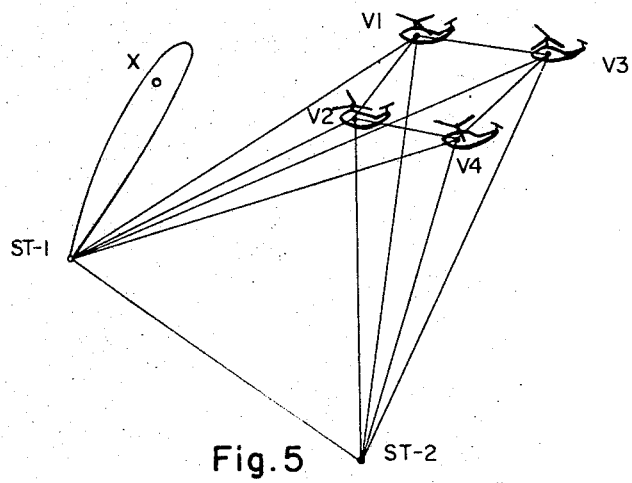
FIG. 5 is a diagram schematically illustrating another embodiment of the invention.

FIG. 5 shows another technique, in which the ranges are not very great, for instance as compared with the ranges and geographical area covered by the system as illustrated in FIG. 1. For example, suppose a military application in which there are four aircraft or other vehicles labeled V1, V2, V3, and V4 which are intended to fly over a target X located in a known position with respect to a first fixed station ST1, having suitable computer equipment and being analogous to station A shown in FIG. 1. Suppose that there is also a remote station ST2 whose position is known with respect to ST1, but which does not necessarily have information as to the range and bearing of target X. By a mutual exchange of identity and range among the various units ST1, ST2, V1, V2, V3 and V4, the matrix figure shown in FIG. 5 can be set up by a computer for the purpose of providing a showing of the positions of vehicles V1, V2, V3, and V4 without requiring the taking of any bearings by any of the vehicles involved. If stations ST1 and ST2 are ground stations, then altitude information need only be provided by the vehicles V1 through V4, this altitude being necessary to insure a closed and redundantly checkable geometric figure. Equipped with this information, the computer center ST1 can then easily guide the vehicles to the target X while at the same time providing computer generated commands relayed to the vehicles by suitable data link (not shown) in order to maintain the course toward the target X as well as the desired formation. This information therefore provides an example of guidance to a target of a plurality of vehicles by a station ST1. This station may employ an accurate track radar, R, such as a laser radar equipped with a gyrocompass to provide continuous information concerning the position of the targaret X in the event that the target is moving. If ST1 is not in radio contact with ST2 then a direction finder at one or both stations can, by providing bearings to any of the aircraft, supply data to the computer sufficient to orient the matrix with respect to North.

It should also be noted that where there is a formation of three or more vehicles, a computer and a direction finder in any one of the vehicles can be used to determine the mutual coordinates of the vehicles so that this vehicle can issue guidance instructions to precisely maintain the formation, thus eliminating need for contact with ground stations at all, and the need for any type of ground based computer equipment.

The present invention is not to be limited to the exact forms shown in the drawings for obviously changes can be made therein within the scope of the following claims.

I claim:

1. The method of determining and indicating relative locations of a plurality of vehicles in space, including the steps of:
    (a) measuring at each vehicle by wave propagation and detection means the ranges to at least some of the other vehicles and identifying the latter, and measuring its own altitude;
    (b) transmitting from each vehicle to other vehicles and to a receiving station data including the vehicle's own identity, its altitude, and the identities and measured ranges to said other vehicles;
    (c) computer processing said data at the receiving station to determine the mutual coordinates of a geometric figure in space uniquely representing the relative locations of said vehicles; and
    (d) displaying coordinates of said figure to represent the locations of said vehicles.

2. The method as set forth in claim 1 for determining the positions with respect to the earth of said vehicles, including the steps of:
    (a) measuring at some vehicles the ranges to fixed stations having known earth positions;
    (b) transmitting these ranges to said receiving station; and
    (c) including the coordinates of said fixed-station locations in said computer processing and display steps to orient the geometric figure with respect to the earth.

3. The method as set forth in claim 1 for determining the orientation of said geometric figure with respect to an arbitrary reference direction wherein the system includes both vehicular and fixed-position units including:
(a) measuring at some units by directional wave propagation means the bearing with respect to said direction to other units;
(b) transmitting measured bearings to said receiving station; and
(c) orienting the display of said coordinates with respect to said direction to correspond with the transmitted bearings.

4. In a method as set forth in claim 1, wherein a selected one of said vehicles includes said receiving station, the steps of:
(a) performing said computing and displaying steps in said selected vehicle; and
(b) transmitting guidance instructions to the other vehicles.

5. The method as set forth in claim 1 including the steps of:
(a) providing said vehicles with an accurate common time base divided into synchronized time slots;
(b) assigning a unique time slot to each vehicle;
(c) emitting from each vehicle at a predetermined moment during its own time slot a pulse representing its location;
(d) measuring at other vehicles the range to the emitting vehicle during the latter's time slot by determining the transit time of the emitted pulse; and
(e) transmitting to said receiving station from each vehicle during its own time slot all of the ranges measured during other time slots.

6. The method as set forth in claim 5, including the steps of:
(a) receiving and storing at one vehicle the identity and range and altitude data transmitted by other vehicles during their time slots; and
(b) retransmitting from said one vehicle during its own time slot the stored data to relay the latter toward said receiving station.

7. The method as set forth in claim 5, including the steps of:
(a) encoding into a digital code said identities and altitudes and ranges; and
(b) transmitting said encoded information from said vehicles to said receiving station during the time slot assigned to each transmitting vehicle.

8. A vehicle traffic control system including multiple mobile vehicle units and fixed units, and including at least one computer station, comprising:
(a) means at each unit for determining the identities of and ranges to at least some other units within the coverage of its radial capability, and for determining its own identity and altitude;
(b) means for transmitting from each unit to said station data including the identity and altitude of that unit and the identities and ranges of said other units;
(c) means at the computer station for determining from said transmitted ranges the mutual relative coordinates of the units transmitting said data; and
(d) means for displaying a geometric-figure representation of the units mutually placed according to said coordinates.

9. A traffic control system for plural aircraft each including transmitting and receiving units, comprising:
(a) accurate time clock means in each unit generating a repeating cycle of time slots, the slots generated in the plural units including predetermined mutually synchronized instants, and the units respectively occupying different ones of said time slots;
(b) means in each unit for generating a signal identifying that unit and for generating another signal for marking the momentary position of that unit in space;
(c) means in each unit operative during its own time slot for transmitting its identity signal, and for transmitting its marker signal at one of said predetermined instants;
(d) means in each unit operative during time slots occupied by other units for receiving their identity and marker signals, and responsive to the latter for determining signals representative of the ranges to said other transmitting units;
(e) means in each unit to associate and store said identity and range signals relating to said other units;
(f) computer means operative to receive said identity signals and range signals, and to compute and display the coordinates of a geometric figure including points representing the mutual relative positions of said units based on said range signals; and
(g) means in each unit operative during its own time slot to telemeter associated identity and range signals to the computer means.

10. In combination with the system as set forth in claim 9, at least two stations comprising additional units of the system having positional coordinates which are known to the computer means relative to the earth's coordinates, and these units exchanging identity and marker signals with said aircraft units, whereby the geometric figure determined by the computer means will include the locations of said stations and be oriented by the latter relative to the earth's components.

References Cited

UNITED STATES PATENTS

| | | | |
|---|---|---|---|
| 2,571,386 | 10/1951 | Sarnoff | 343—6 |
| 2,869,115 | 1/1959 | Doeleman et al. | |
| 3,153,232 | 10/1964 | Fletcher et al. | 343—6 |
| 3,312,971 | 4/1967 | Gehman | 343—6.5 |
| 3,336,591 | 8/1967 | Michnik et al. | 343—6.5 |

RODNEY D. BENNETT, *Primary Examiner.*

M. F. HUHLER, *Assistant Examiner.*